United States Patent [19]

Shinohara

[11] Patent Number: 4,675,741
[45] Date of Patent: Jun. 23, 1987

[54] IMAGE FORMING APPARATUS
[75] Inventor: Yukimasa Shinohara, Funabashi, Japan
[73] Assignee: Canon Kabushiki Kaisha, Tokyo, Japan
[21] Appl. No.: 784,762
[22] Filed: Oct. 7, 1985
[30] Foreign Application Priority Data
Oct. 16, 1984 [JP] Japan ................... 59-217540
[51] Int. Cl.⁴ .................. H04N 1/00; H04N 1/10
[52] U.S. Cl. ..................... 358/256; 358/280; 358/293; 355/14 SH
[58] Field of Search ............ 358/256, 293, 280; 355/7, 14 SH
[56] References Cited
U.S. PATENT DOCUMENTS
4,422,100 12/1983 DuVall et al. ............... 358/294

Primary Examiner—Edward L. Coles, Sr.
Attorney, Agent, or Firm—Fitzpatrick, Cella, Harper & Scinto

[57] ABSTRACT

The image forming apparatus is selectively operable in an automatic original feeding mode and in a manual original setting mode wherein the position at which the original is set for copying is different between the automatic original setting mode and the manual original setting mode. The difference can result in a deviation of the image formed on a copy sheet. The apparatus is provided with an image reader and a scanner for forming an image in accordance with the output of the reader. The apparatus includes a regulator actable on the reader or the scanner to eliminate the deviation on the copy sheet, allowing the deviation in the original setting.

28 Claims, 10 Drawing Figures

IMAGE FORMING APPARATUS

FIELD OF THE INVENTION AND RELATED ART

The present invention relates to an image forming apparatus, more particularly, to an image forming apparatus wherein an original is read by a reader, and an image is formed in accordance with the signals from the image reader.

Automatic document (or original sheet) feeders are divided into two types, in one of which only one side of an original is automatically aligned with an original supporting table (which will hereinafter be called "platen"); and in the other of which both sides of a duplex original are automatically aligned with the platen. The former type is known as an automatic document feeder (ADF), and the latter is known as an automatic recirculation document feeder (RDF).

In either of those types, the image recording apparatus is so constructed that an original cover is pivotable about a hinge provided at a rear side of the platen of the apparatus, such as a copying machine in order to enable an operator to take a copy from a thick original such as a book. Hereinafter, "book mode" means the way in which a book or a sheet of document is placed on the platen and copied, and the original used in the book mode is called "a book original".

Figure 8:
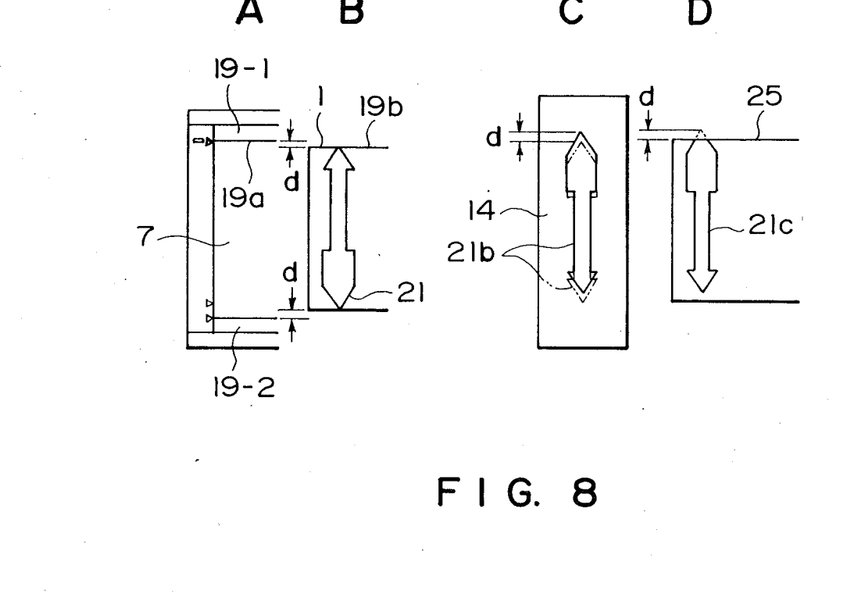
FIG. 8 illustrates image positions in a conventional apparatus.

Referring first to FIG. 8, there is shown positions of images formed by an image forming apparatus. As shown by the reference A in FIG. 8, index plates 19-1 and 19-2 having a thickness of approximately 0.5 mm are provided, which also function as reference stops for book originals, to which the book originals are abutted when they are to be copied so that they are correctly positioned on the platen in that direction. They are provided at the rear side (remote from the operator) and front side (near the operator) of the platen 7. An edge 19a of the index plate 19-1 serves to be a reference position when a one-two-one copy is to be formed. An original feeding belt (not shown) of an automatic document feeder or recirculation document feeder is arranged so as to bridge between the index plates 19-1 and 19-2.

When the automatic document feeder or recirculation document feeder is used, the reference position is the one indicated by a reference numeral 19b which is somewhat away from the book original reference position 19a by the distance d of 2-3 mm so as to allow smooth travel, by the belt, of the sheet originals on the platen 7 (FIG. 8, B). The position 19b is spaced from an edge of the feeding belt by a necessary and sufficient distance.

In the image forming apparatus having such reference positions, the positions of the images 21b formed on a photosensitive drum 14 are different between when the book original is copied without using the automatic document feeder or recirculation document feeder and when the sheet original is copied with the use thereof, as shown in FIG. 8, C. The positional deviation is equal to the interval d between the reference position 19a and the reference position 19b. As a result, there is a positional difference d between the images 21c which are formed on copy sheets 25 from the book original and from the original set by the automation feeder, as shown in FIG. 8, D.

For this reason, the copy 25 includes an image of the feeding belt having the width of d adjacent the top edge of the sheet original (bottom side of the copy 25), while the bottom portion of the image 21 of the original in the width of d is missing in the copy 25, as best seen in FIG. 8, D. Further, when either type of the document feeders is used, the sheet originals are fed such that the position of the sheet originals varies on the platen 7 although the amount is small. Thus, the conventional document feeders involve those drawbacks.

SUMMARY OF THE INVENTION

Accordingly, it is a princpal object of the present invention to eliminate at least one of the drawbacks involved in the conventional apparatus.

It is another object of the present invention to provide an improved image forming apparatus.

It is a further object of the present invention to provide an image forming apparatus wherein a proper image is formed in accordance with modes of operation relating to the ways of setting the originals on the platen.

It is a yet further object of the present invention to provide an image forming apparatus capable of operating in a book mode and an automatic original feeding mode, wherein the positional differences depending on the modes selected is eliminated.

It is a yet further object of the present invention to provide an image forming apparatus capable of operating in an automatic original feeding mode, wherein an adjustment is effected so as to avoid the positional deviation possibly appearing in the individual feedings of the originals.

It is a yet further object of the present invention to provide an image recording apparatus wherein the timing of image signal output in the main scanning direction is automatically changed when an automatic document feeding mode is selected so that the image is formed on a recording sheet at a proper position irrespective of whether or not the automatic document feeding mode is selected.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
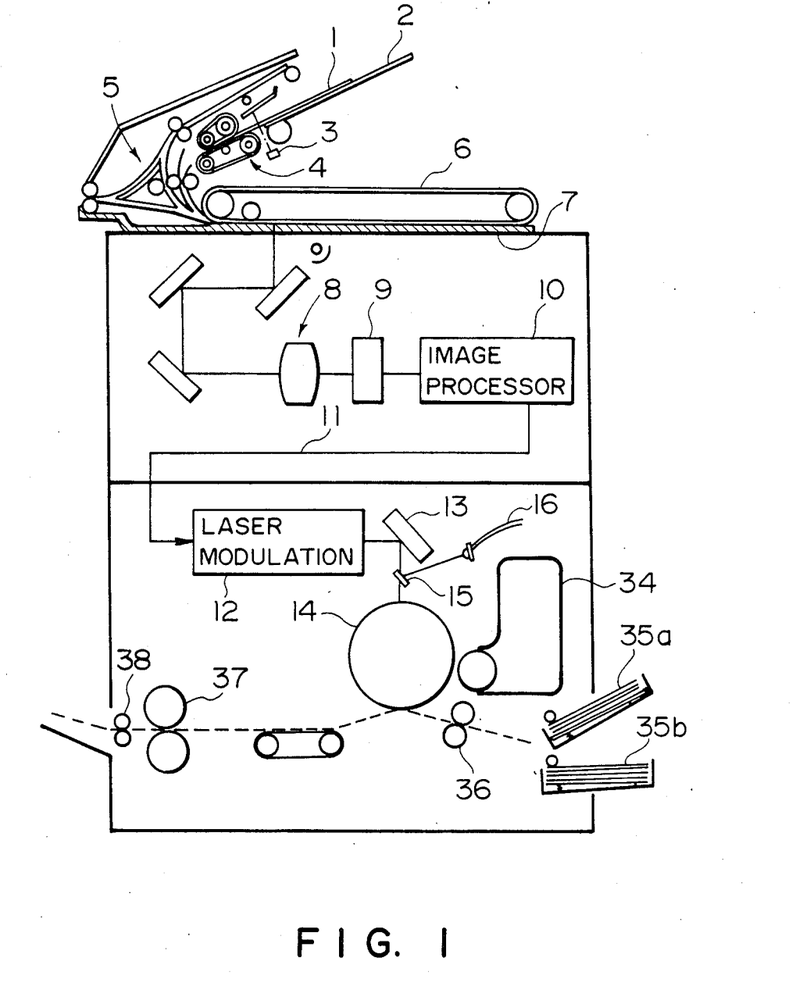
FIG. 1 is a somewhat schematic sectional view of an image recording apparatus provided with a recirculation document feeder according to an embodiment of the present invention.

Referring now to FIG. 1, there is shown a copying machine using a laser beam and provided with a recirculation document feeder. An original 1 is placed on an original stacking table 2 and is fed out one-by-one by separation-feeding means 4 including a pre-feeding roller, separation rollers, feeding rollers and so on, and the original 1 is conveyed to the platen 7 through various sheet passages 5 by a feeding belt 6 and rollers.

The original 1 on the platen 7 is illuminated by a lamp and is scanned through an optical system 8. The light reflected by the original 1 is received by a photoreceptor (line sensor in this embodiment) 9 and is converted into electric signals corresponding to picture elements representing the light image. The electric signals produced in accordance with the densities of the picture elements are stored in a memory in an image processing station 10, where the electric signals are processed for the purpose of reversal editing, for example, if necessary and are read out. The electric signals thusly read out are transmitted through a cable 11 to a laser modulator 12, where the electric signals are transduced into a modulated laser beam. The modulated laser beam is projected onto a photosensitive drum by way of a mirror 13 so that the photosensitive drum 14 is exposed to light. Prior to this stage, the photosensitive drum 14 having a photosensitive layer is uniformly charged electrically, and therefore, a latent image is formed in accordance with the exposure to the modulated laser beam. The electrostatic latent image is developed by a developing device 34. A paper cassettes 35a and 35b contain copy sheets, which are picked up one by one and fed to a registration roller 36, by which the copy sheet is once stopped. The registration roller 36 starts rotating to feed the copy sheet so as to bring it into alignment with the leading edge of the image on the photosensitive drum 14. The developed image is transferred by means of a known transfer charger or the like onto the copy sheet. The image on the copy sheet is fixed into a permanent image and then discharged by discharging rollers 38 to a discharge tray.

Upstream of the separation-feeding means 4 of the original stacking table 2, there is provided an original sensor 3 which constitutes a photocoupler. When the original or originals 1 are set on the table, the optical path of the photocoupler is shut, whereupon the signal representing that the originals 1 are set thereon is transmitted to the image processing station 10 or to a laser modulator 12.

A beam detecting mirror 15 for detecting the laser beam is disposed at a side edge portion of the range of the optical path between the mirror 13 and the photosensitive drum 14. The beam detected by the beam detecting mirror 15 is transmitted through an optical fiber cable 16 to the laser modulator 12 to determine the starting position of the image light projection on the photosensitive drum 14 in the main scanning direction (longitudinal direction of the drum).

Figure 2:
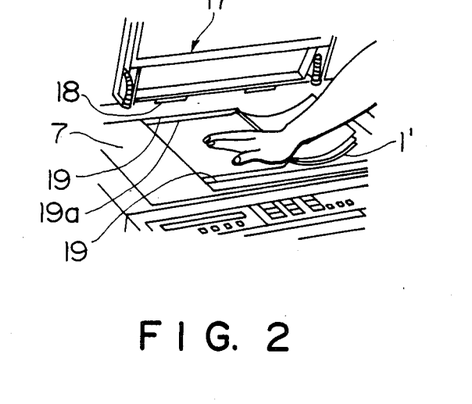
FIG. 2 illustrates a copying operation when the recirculation document feeder is not used in the apparatus shown in FIG. 1.
Figure 3:
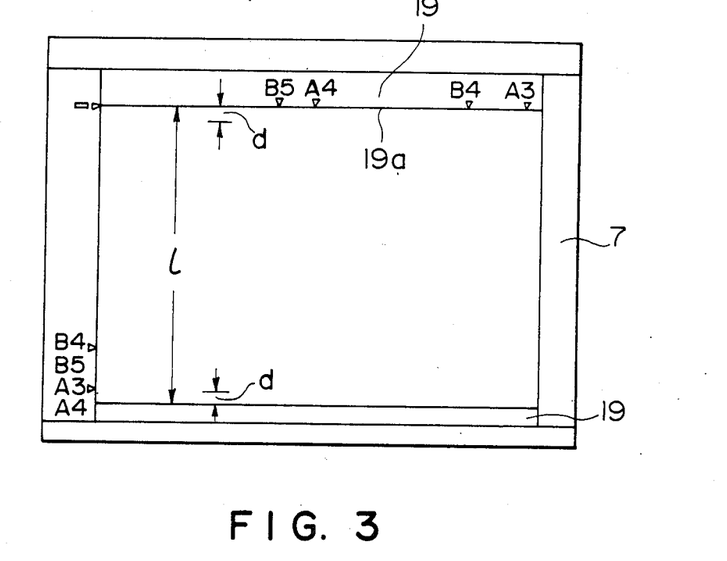
FIG. 3 is a plan view of a platen.

FIG. 2 shows the elements around the platen 7 when the recirculation document feeder is not used. FIG. 3 is a plan view of the platen 7. In FIG. 2, the recirculation document feeder 17 is shown as being lifted about the hinge 18 to open the platen 7. On the platen 7, an index plates 19 are fixed at the front side (near the operator) and at the rear side (remote from the operator). In FIG. 2, a book original is placed on the platen 7 in the manner that the top edge of the original 1' is abutted to that side (a reference position 19a) of the rear index plate 19.

Figure 4:
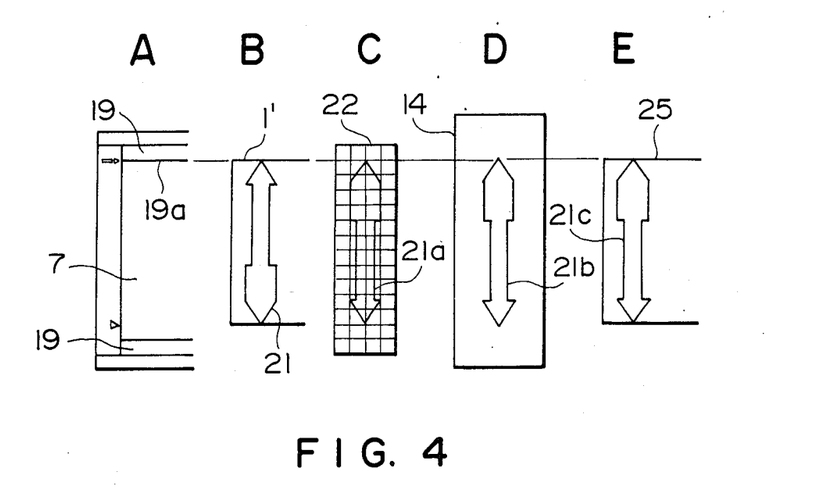
FIG. 4 illustrates image positions when the recirculation document feeder is not used.

FIG. 4 illustrates the relation among the image on a book original 1', the image 21b on the photosensitive drum 14 from the original image and the image formed on the copy sheet 25 from the image on the photosensitive drum 14, when the recirculation document feeder 17 is not used. As designated by reference characters A and B in FIG. 4, the top edge of the book original 1' is just at the reference position 19a of the index plate 19 on the platen 7. It is assumed that the image 21 on the original 1' occupies the entire length of the original 1'. When such an original 1' is optically scanned and stored in the line memory 22 in the image processing station 10, the opposite edges of the image in the memory 22 are in accord with the edge of the image on the original although the image in the memory 22 is reversed. When the scan is effected with the image 21a in the line memory 22 on the photosensitive drum 14, the image (electrostatic latent image) 21b is formed on the photosensitive drum 14 in the corresponding position as shown by D in FIG. 4 so that a copied image 21c is formed on the copy sheet, wherein the edges of the image 21c are desirably in accord with the edges of the copy sheet 25, as shown in FIG. 4, E.

In this embodiment, as shown in FIG. 3, the interval between the inside edges of the front and rear index plates 19 and 19 is 297 mm+5 mm (=l), for example. In other words, the distance is so determined that when an original having the size of A4 or A3 (Japanese Industrial Standard) is copied using the recirculation document feeder 17, the original 1 is moved smoothly, since the index plates are disposed with the distance d of 2.5 mm from the respective edges of the original. The long side of A4 size and the short side of A3 size has the length of 297 mm.

Therefore, when the sheet original 1 is set on the platen 7 by automatically feeding it thereto by the recirculation document feeder 17, there occurs a deviation of approximately equal to d=2.5 mm toward the operator on the platen 7 as compared with the case where the book original 1' is set on the platen 7 with its top edge is in accord with the reference 19a.

The method and device for correcting the deviation d will be described. In the first embodiment, the address at which the memory starts to be read out of the line memory 22 is changed. When the original to be copied with the use of the recirculation document feeder 17 is placed on the original stacking table 2, the original 1 intercepts the optical path of the photocoupler shown in FIG. 1 so that the original sensor 3 detects the presence of the original. The original sensor 3 transmits a signal to the image processing station 10, which operates so that the memory is read out of the line memory 22 starting at the address corresponding to the position approximately 2.5 mm in advance.

Figure 5:
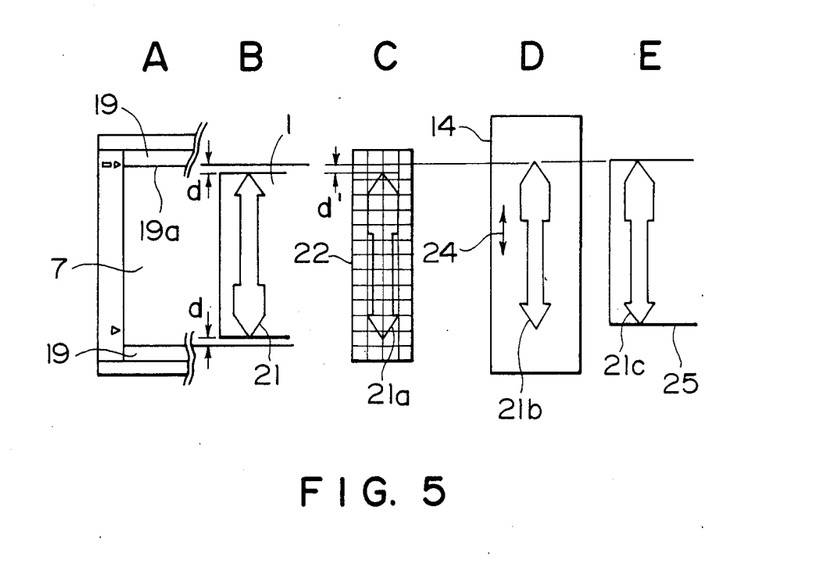
FIG. 5 illustrates the image positions when the recirculation document feeder is used.

When the recirculation document feeder 17 starts and brings the original 1 on the platen 7 at the predetermined position, the top and bottom edges of the original is approximately 2.5 mm away from the associated index plates 19, as shown in FIG. 5, A and B. The image 21 on the original 1 is received through the optical system 8 and is received by a photoreceptor 9, by which it is transduced into electric signals corresponding to the picture elements representing the image. Then, the image 21 on the original 1 is stored in the line memory 22 of the image processing station 10. Here, the position of the store is deviated by the amount of d' which corresponds to the deviation d of the image 21 from the reference position 19a of the index plate, as shown in FIG. 5, C.

Thus, in response to the original sensor 3, the image processing station 10 starts, at an address advanced by the amount corresponding to d'=2.5 mm, to read out of the line memory 22. Therefore, the light image applied to the photosensitive drum 14 by the laser modulator 12 is displaced by the amount of d=2.5 mm in the main scanning direction, which is the direction indicated by an arrow 24 as shown in FIG. 5, D. Correspondingly, an electrostatic latent image 21b is formed on the photosensitive drum 14 with such a displacement, that is, at the proper position. In this manner, a copy image 21c is formed at the same position as when a book original 1' is copied without the use of the recirculation document feeder 17, as will be understood from FIG. 5, E and FIG. 8, D, although the original positions are different by approximately 2.5 mm.

In a second embodiment, the time of the start of writing, instead of reading-out, the image is changed.

Figure 6:
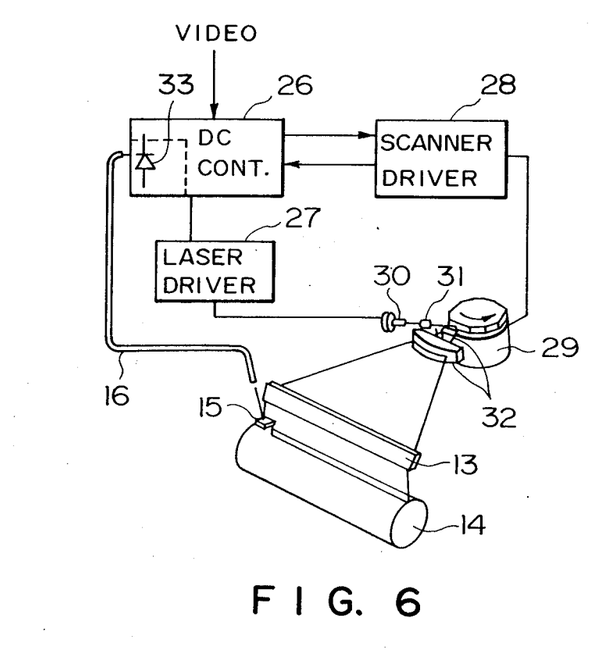
FIG. 6 illustrates another embodiment of the present invention.
Figure 7:
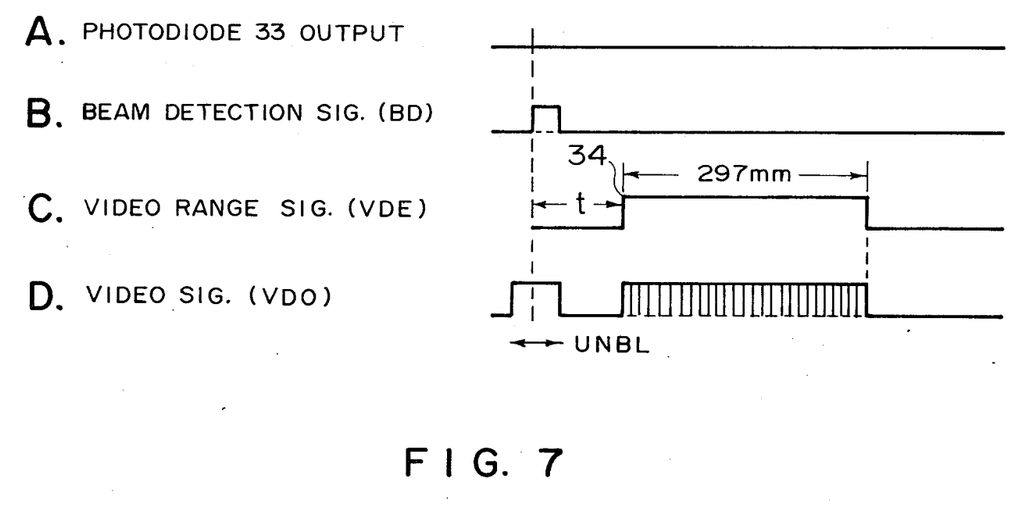
FIG. 7 is a time chart relating to the apparatus shown in FIG. 6.

FIG. 6 illustrates the second embodiment, and FIG. 7 is a time chart of the video signals produced. In the laser modulator 12, a DC controller 26, receiving the video signals from the image processing station 10, transmits the video signals to a laser driver circuit 27. On the other hand, a scanner driving circuit 28 receives from the DC controller 26 synchronization signals so that the polygonal mirror 29 rotates on the basis of the synchronization signals. The laser driver circuit 27 drives a laser unit 30, which in turn produces a laser beam. The laser beam is passed through a cylindrical lens 31 and is incident on the rotating polygonal mirror 29. The laser beam, reflected by the polygonal mirror 29, is passed through an imaging lens 32 and then reflected by the mirror 13 to be incident on the surface of the photosensitive drum 14 so that an electrostatic latent image is formed thereon. When the beam detecting mirror 15 receives the beam, the optical fiber cable 16 transmits it to a photodiode 33 of the DC controller 26. The photodiode 33 receives the light from the beam detecting mirror 15 through the optical fiber cable 16 and produces the signal as shown in FIG. 7, A, in response to which the DC controller 26 produces a beam detection signal (BD) as shown in FIG. 7, B. A certain period of time after the beam detection signal, the image writing starts. The period of the time is indicated by "t" in FIG. 7, C. By changing or controlling this time period t, the position of the image 21c can be changed on the photosensitive drum 14. Since the position of the beam detecting mirror 15 is fixed, and since the speed of the main scan is constant, the position of the starting edge of the video range signals is regulated by changing the period of time t, as shown in FIG. 7, D. Thus, the start of the image writing of the image 21c is controlled on the photosensitive drum 14. The instructions of changing the starting position is effected in response to the signal produced by the original sensor 3.

The DC controller 26 is capable of projecting the laser beam only onto the detecting mirror 15 area on the basis of the beam detection signal, and therefore, the beam detection signal may be produced continueously.

According to those embodiments which relate to an image forming apparatus wherein an automatic sheet original feeder can be selectively used, the difference in the image position, on the copy sheet, which may otherwise exist between when the copy is taken with the use of the automatic sheet original feeder and when a book original is copied without the use of the automatic feeder, can be eliminated. Therefore, a missing part of the image on the copy does not occur nor an image of the covering belt which can appear when it is stained.

In the description of the foregoing embodiments, the material on which the copied image is formed has been described as a copy sheet, or paper, but any image bearing or recording material or sheet is usable if it can record an image.

Figure 9:
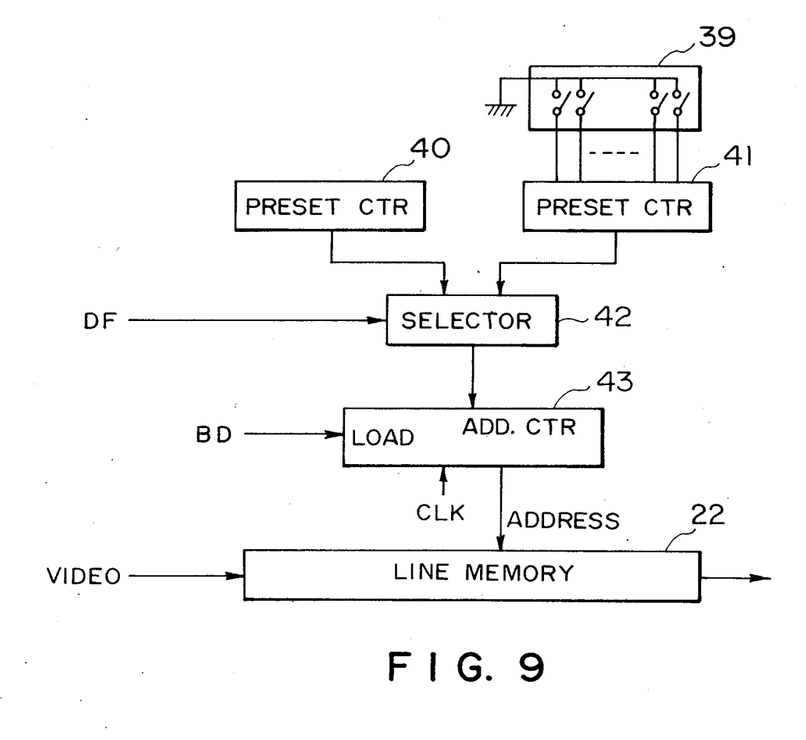
FIG. 9 is a block diagram of control in the embodiment of the present invention shown in FIG. 1.

FIG. 9 illustrates the control of the apparatus according to the first embodiment described above. The control system includes preset counters 40 and 41 for setting the address of the line memory 22 at which the reading-out operation starts. The selector 42 selects the preset counter 41 in response to a DF signal produced from the original sensor 3 when the recirculation document feeder or automatic document feeder is used. An address counter 43 is set to be the count of the preset counter 41, whereby the starting address of the line memory 22 is determined. When the beam detection signal BD is input to the address counter 43, the address counter 43 counts up from the predetermined address, and the video signals are sequentially read out of the line memory 22.

The preset counter 40 is used when neither of the recirculation document feeder or the automatic document feeder is used. Therefore, when in the book mode, the preset counter 40 is selected by the selector 42.

In this manner, the starting address of the line memory 22 in the book mode and the starting address thereof in the automatic document feeding mode are respectively set by the preset counters 40 and 41, with the result that the deviation d=2.5 mm can be eliminated in the manner described hereinbefore. A different apparatus can have a more or less different deviation of the image position between the book mode and the automatic original feeding mode. On such an occasion like this, the count of the preset counter 41 may be adjusted by an adjusting switch 39 to harmonize the difference. The adjustment with the use of the adjusting switch 39 may be performed by an operator or a servicing expert in the actual apparatus on the basis of the deviation recognized when the recirculation document feeder or the automatic document feeder is actually used.

The reading operation of the video signals from the line memory 22 corresponds to the size of the original.

As described above, the apparatus of the embodiment provided with the adjusting switch 39 can meet the differences in the deviations of the individual image forming apparatuses.

Next, the description as to the adjustment of image position between the book mode operation and the automatic document feeding mode operation in the subordinate scanning direction will be made.

Figure 10:
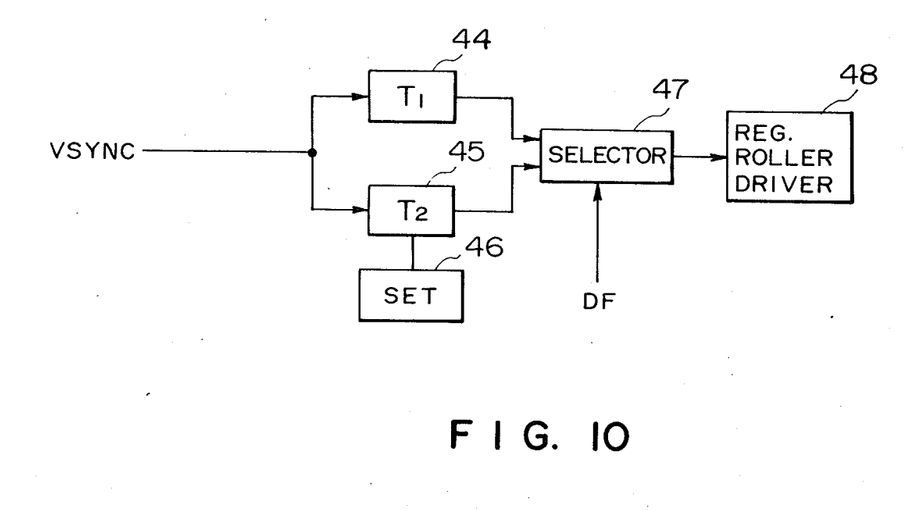
FIG. 10 is a block diagram of the control of the image position in a sub-scanning direction in an embodiment of the present invention.

FIG. 10 illustrates the control system for this purpose, the positional deviation of the original in the sub-scanning direction which is perpendicular to the main scanning direction, when the recirculation document feeder or the automatic document feeder is used, is obviated by a timer 45. More particularly, the instance when the registration roller 36 starts feeding the copy sheet to the photosensitive drum 14 is delayed by the timer 45 by the amount of the positional difference of the original from the reference position on the platen 7 in the normal (book) mode.

When the original is correctly positioned in alignment with the reference position on the platen in the normal mode (book mode), a copy cycle starting signal VSYNC is produced from the image processing station 10, and on the basis of the signal VSYNC, the movement of the optical system and the copy sheet feeding are effected. The registration roller 36 starts, a certain period T1 of time after the production of the VSYNC signal so that the leading edge of the image on the photosensitive drum 14 is brought into alignment with the leading edge of the copy paper. The delay time is provided by a timer 44. Another delay period of time T2 of a timer 45 is different from the period T1 by the amount corresponding to the deviation of the original stopping position on the platen in the automatic original feeding mode from that in the book mode.

The delaying period of time T2 of the delaying timer 45 is changeable by a setting switch 46. A selector 47 selects a delaying timer 45 when the signal DF is produced (in the automatic document feeding mode), while the delaying timer 44 is selected upon the book mode selected.

As described, the apparatus in this embodiment can obviate the positional deviation of the image in the subordinate scanning direction in the automatic document feeding mode.

In this embodiment, the original in the book mode is set on the platen 7 in alignment with the original reference position. However, it is a possible alternative that before the scanning opertion, a pre-scanning operation is effected to detect the position of the original, and in accordance with the detected position, the delaying timer 44 and the count of a preset counter 40 are set, whereby a proper copy image can be provided on the copy sheet even if the original is set out of alignment with the reference position.

The foregoing description has been made with respect to the image forming apparatus wherein the original supporting table (platen) is fixed during the original being scanned, but it is also possible to use the present invention in the case where the original is moved while being scanned or read.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus operable in a manual original setting mode and in an automatic original setting mode, comprising:
   means for reading an original at a reading station, said reading means having an effective reading area;
   means for forming an image in accordance with the image on the original read by said reading means;
   means for automatically conveying the original to the reading station in the automatic original setting mode; and
   means for shifting the effective reading area of said reading means in a direction perpendicular to a direction of conveyance of the original in dependence of the original setting mode.

2. An apparatus according to claim 1, wherein said original setting modes contain an automatic document setting mode and a manual original setting mode.

3. An apparatus according to claim 2, further comprising an original supporting platen.

4. An apparatus according to claim 3, wherein said original supporting platen is provided with a reference member for indexing an original supporting position.

5. An apparatus according to claim 4, wherein said reference member determines the original supporting position in the manual original setting mode.

6. An apaparatus according to claim 1, wherein said reading means includes a line sensor.

7. An apparatus according to claim 6, further comprising a line memory corresponding to said line sensor.

8. An apparatus according to claim 7, further comprising means for shifting a position of the image formed by said image forming means by changing a starting address of image reading operation out of said line memory, in accordance with the original setting mode selected.

9. An apparatus according to claim 8, further comprising a photosensitive drum, wherein said image forming means writes the image read out of said line memory, by a laser beam on said photosensitive drum in a direction of a main scan.

10. An apparatus according to claim 5, wherein when in an automatic original setting mode, the position of the image formed by said image forming means is shifted by an amount corresponding to a difference in an original setting position between the automatic original setting mode and the manual setting mode wherein an original setting position is determined by said reference member.

11. An apparatus according to claim 7, wherein the image position shifting is effected by changing a position at which the image stored in said line memory starts to be read out, in accordance with the original setting mode selected.

12. An apparatus according to claim 7, further comprising adjusting means by which a position of the image formed by said image forming means is set with respect to an image recording position of said reading means in response to the original setting mode selected.

13. An image forming apparatus operable in a manual original setting mode and in an automatic original setting mode, comprising:
   means for reading an original at a reading station, said reading means having an array of reading elements;
   means for forming an image in accordance with the image on the original read by said reading means;
   automatic original setting means for automatically setting the original at an image reading station in the automatic original setting mode;
   means for changing a reading start position of the array of the reading elements in a direction of the array in dependence of whether the apparatus is in the manual original setting mode or in the automatic original setting mode.

14. An apparatus according to claim 13, further comprising an original supporting platen, to which said automatic original setting means automatically feeds and sets the original.

15. An apparatus according to claim 14, wherein said original supporting platen is provided with a reference member for indexing an original supporting position.

16. An apparatus according to claim 15, wherein said reference member determines the original supporting position in the manual original setting mode.

17. An apparatus according to claim 13, wherein said reading means includes a line sensor.

18. An apparatus according to claim 17, further comprising a line memory corresponding to said line sensor.

19. An apparatus according to claim 18, wherein a position of the image formed by said image forming means is shifted by changing an address at which the image starts to be read out of said line memory, in accordance with a deviation, in the direction of the array of the original setting position from the original supporting position determined by said reference member, arising in the automatic original setting mode.

20. An apparatus according to claim 18, wherein a position of the image formed by said image forming means is shifted by changing an instance when the image starts to be read out of said line memory, in accordance with a deviation in the direction of the array of the original setting position from the original supporting position determined by said reference member, arising in the automatic original setting mode.

21. An image forming apparatus operable in a manual original setting mode and in an automatic original setting mode, comprising:
- a line sensor for reading an original at a reading station;
- a memory for memorizing information of the original read by said line sensor;
- means for forming an image in accordance with the information in said memory;
- means for automatically setting the original at the reading station; and
- control means for changing access to said memory in dependence of whether the apparatus is in the manual original setting mode or in the automatic original setting mode.

22. An apparatus according to claim 21, further comprising an original supporting platen, to which said automatic original setting means automatically feeds and sets the original.

23. An apparatus according to claim 22, wherein said original supporting platen is provided with a reference member for determining an original supporting position.

24. An apparatus according to claim 23, wherein said reference member determines the original supporting position in the manual original setting mode.

25. An apparatus according to claim 21, wherein said control means changes a start position of reading-out from the memory by an amount corresponding to a difference in a direction of a line along which said line sensor is arranged, between in the manual original setting mode and in the automatic original setting mode.

26. An apparatus according to claim 21, wherein said control means changes a start timing of reading-out from the memory by an amount corresponding to a difference in a direction of line along which said line sensor is arranged, between in the manual original setting mode and in the automatic original setting mode.

27. An apparatus according to claim 1, wherein said shifting means does not operate in the manual mode and operates only in the automatic mode.

28. An apparatus according to claim 21, wherein said control means changes reading-out of the information from said memory.

* * * * *

UNITED STATES PATENT AND TRADEMARK OFFICE
CERTIFICATE OF CORRECTION

PATENT NO. : 4,675,741

DATED : June 23, 1987

INVENTOR(S) : YUKIMASA SHINOHARA

It is certified that error appears in the above-identified patent and that said Letters Patent is hereby corrected as shown below:

COLUMN 3

Line 36, "A paper" should read --Paper--.
    Line 68, "an" should be deleted.

COLUMN 4

Line 38, "has" should read --have--.
    Line 46, "is" should be deleted.
    Line 61, "at" should read --to--.
    Line 63, "is" should read --are--.

COLUMN 5

Line 65, "continueously." should read --continuously.--.

COLUMN 6

Line 59, "pose, the" should read pose. The--.

COLUMN 7

Line 22, "selected." should read --being selected.--.
    Line 30, "opertion," should read --operation,--.
    Lines 61-62, "dependence of" should read --dependence upon--.

COLUMN 8

Line 7, "apapratus" should read --apparatus--.
    Line 49, "mode;" should read --mode; and--.
    Line 52, "dependence of" should read --dependence upon--.

UNITED STATES PATENT AND TRADEMARK OFFICE
CERTIFICATE OF CORRECTION

PATENT NO. : 4,675,741
DATED : June 23, 1987
INVENTOR(S) : YUKIMASA SHINOHARA

It is certified that error appears in the above-identified patent and that said Letters Patent is hereby corrected as shown below:

COLUMN 9

Line 5, "deviation," should read --deviation--.
Line 32, "dependence of" should read --dependence upon--.

Signed and Sealed this

Fourteenth Day of February, 1989

Attest:

DONALD J. QUIGG

Attesting Officer        Commissioner of Patents and Trademarks